United States Patent [19]

Cheng

[11] Patent Number: 4,793,066

[45] Date of Patent: Dec. 27, 1988

[54] PIPE JOINT INTERSECTION CONTOUR SCRIBER

[76] Inventor: Wang X. Cheng, c/o Servicing Team of Petroleum Piping Company, Qin Huang Dao, Hebei Province, China

[21] Appl. No.: 64,015

[22] Filed: Jun. 19, 1987

[30] Foreign Application Priority Data

Jun. 20, 1986 [CN] China ................................ 86204124

[51] Int. Cl.[4] .............................................. B23K 37/00

[52] U.S. Cl. ....................................... 33/21.3; 33/529; 33/DIG. 1

[58] Field of Search ........................ 33/21.3, 21.1, 529, 33/DIG. 1

[56] References Cited

U.S. PATENT DOCUMENTS

| | | | |
|---|---|---|---|
| 1,991,117 | 2/1935 | Porteous et al. | 33/21.3 |
| 2,389,286 | 11/1945 | Watkins | 33/21.3 |
| 2,659,972 | 11/1953 | Norris | 33/21.3 |
| 3,835,541 | 9/1974 | Whitworth | 33/21 C |
| 4,277,894 | 7/1981 | Duhe | 33/21 C |

FOREIGN PATENT DOCUMENTS

| | | | |
|---|---|---|---|
| 545026 | 2/1932 | Fed. Rep. of Germany | 33/21.3 |

*Primary Examiner*—William D. Martin, Jr.
*Attorney, Agent, or Firm*—Robert R. Jackson

[57] ABSTRACT

A novel multifunctional contour scriber is disclosed for the use in scribing the intersection contour when an arbitrary geometric body intersects a pipe at arbitrary angle. This multifunctional contour scriber can also be used for scribing at any angle a circle, equally spaced points along a circle, an ellipsoid, a hyperbola, a parabola, an inner or outer cycloid, or an involute of a circle, etc. on a plane, a concave or convex surface. The invention consists of a magnetic base, a rotary unit, a hinge unit, a locking unit, a longitudinal rod, a longitudinal rod disc, a transverse rod, a transverse rod disc, guide sleeves, and scribing units. When scribing the intersection contour on the main pipe, the scriber is secured by the magnetic base on the main pipe. While scribing on the branch pipe, the scriber may be either secured on the ground or fixed in the internal wall of the branch pipe using three strute bars, thus it is readily adapted to delineating intersection contours directly onto the main pipe or branch pipe of various sizes without the necessity of making any developed view or template.

11 Claims, 8 Drawing Sheets

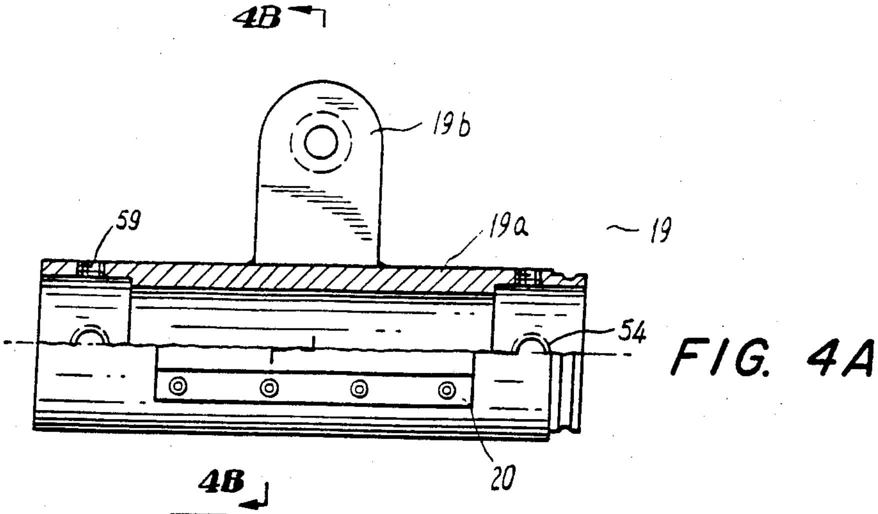
FIG. 4A
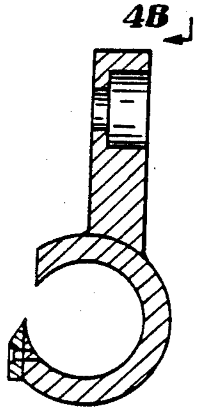
FIG. 4B
FIG. 5A
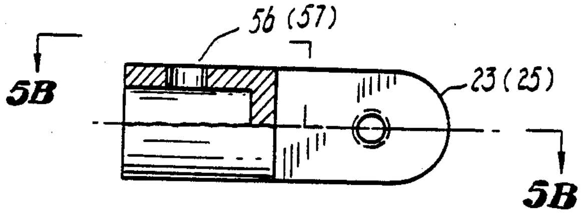
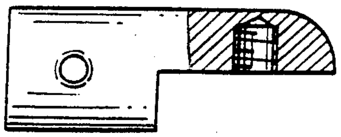
FIG. 5B

PIPE JOINT INTERSECTION CONTOUR SCRIBER

BACKGROUND OF THE INVENTION

The present invention relates to three dimensional contour scribers and more particularly to a pipe joint intersection contour scriber.

In machine working and manufacturing industry, traditionally employed method to delineate an intersection contour between a body with arbitrary geometric configuration and a cylindrical pipe intersecting the former at arbitrary junction angle includes tedious processes, such as drafting the contour on a developed surface, making a template, etc. Errors may thus be accumulated in these processes and lead to an unaccurate intersection contour being delineated. Yet there may be no way to draft the developed view for an undevelopable geometric body. Circular index, height gauge and other auxillary tools are therefore utilized to scribe a circle, an ellipsoid, a hyperbola, a parabola, or equally spaced points along a circle, etc. with an arbitrary angle on a plane, a negative or a positive camber, a convex or a concave surface, but these tools usually cannot be used for large size machine parts, thus auxillary tools have to be employed and they may cause serious errors.

DESCRIPTION OF PRIOR ART

Some portable devices have been developed for accomplishing the scribing and/or cutting intersection contours. In example, U.S. Pat. No. 4,277,894 discloses a pipe joint intersection contour scriber which consists of a three disc-assembly two of the discs have geartooth formed on the periphery thereof to engage worm gears. In operation, a template must be made in advance and inserted into the scriber unit, a follower disc then moves along the template contour and a scriber point delineates the intersection contour on the pipe to be cut. Necessarily, some disadvantages inhere in the scriber. The pipe to be cut should be positioned through the three central holes of the three disc-assembly. The diameter of central holes set a limit on the maximum external diameter of the pipe to be cut, this scriber therefore can only be used for a limited range of pipe sizes; Different templates with different sizes must be prepared for different types of pipes; Yet manufacturing worm screws and gears will be somewhat difficult. It is therefore time-consuming and laborious.

U.S. Pat. No. 3,835,541 discloses another pipe joint intersection contour scriber termed "ellipsoid marker and template tracer". In operating this scriber, the main pipe and branch pipe must be connected together using a band and a clamp mechanism to secure the scriber to the main pipe and an expanding chuck to mount the branch pipe to the scriber. Apparently, these mounting and clamping accessories can only be used in a limited range of pipe sizes. It is especially difficult to mount a large size branch pipe to the scriber. A sheet paper wrapping a replica of the branch pipe therefore must be used in this case to form a templete, and the accuracy of the template depends on how may points are made by successive measurements to form the templete. The operating procedure is complicated, resulting an unaccurate intersection contour being delineated.

Other patents disclosing similar art may be found, but they all can only scribe the intersection contour of two cylindrical pipes, and each of the scribers usually has only one function. Therefore, they are not satisfactory in my professional field in which scribing the intersection contours for a cylindrical pipe intersecting an arbitrary geometry body as well as the pipes with different diameters intersecting each other in different manner is in urgent need.

OBJECT OF THE INVENTION

A primary object of the present invention is to provide a three dimensional contour scriber for delineating the intersection contour of a cylindrical pipe intersecting an arbitrary geometric body at arbitrary angle, and for scribing at any angle a circle, equally spaced points along the circle, an ellipsoid, a hyperbola, a parabola, an inner or outer cycloid, an involute of a circle, etc. on a plane, a concave or a convex surface. The scriber should be readily adapted to various sizes of pipes and various intersection contour curves.

Yet another object of the present invention is to provide a simple structured, readily adjusted and installed pipe joint intersection contour scriber which can delineate intersection contour directly onto the main or branch pipe without the necessity of making any developed view or templete.

BRIEF DESCRIPTION OF THE INVENTION

The present invention of pipe joint intersection contour scriber comprises a magnetic base, a rotary unit, a hinge unit, a locking unit, a longitudinal rod, a lingitudinal rod disc, a transverse rod, a transverse rod disc, guide sleeves and scribing units.

Four permanent magnet switches are attached on the magnetic base. When the base is put on working surface and the switches are turned on, the magnetic base will be attracted securely onto the working surface. The upper and lower surfaces of the mangetic base are parallel to each other. On the lower surface, there is a V-shaped groove whose central line perpendicularly crosses the axis of the magnetic base. This makes the axis of the longitudingal rod naturally cross the pipe axis. Two level gauges are mounted on the upper surface of the magnetic base.

The rotary unit includes a 360°-graduated disc whose axis coincide with the axis of the magnetic basc. The 360°-graduated disc is mounted on the magnetic base and can rotate in a full range of 360° relative to the latter. The rotary angle is indicated by an angle measuring slider on the magnetic base. A surpporting bush is used to mount a hinge unit. A bow-shaped 180°-graduated disc is verticaly mounted on the magnetic base.

The hinge unit includes a hinge shaft which is rotatably mounted in thc supporting bush. A radial hole on the hinge shaft is used to fix the longitudinal rod whose bottom end is thus hinged to the 360°-graduated disc and can rotate with the hinge shaft in a plane perpendicular to the magnetic base within the range of 0° to 180°. The rotary angle is indicated by an angle measuring slider on the bow-shaped 180°-graduated disc.

Locking unit on the above mentioned hinge shaft is used to lock the said longitudinal rod at a predetermined position.

The Longitudinal rod disc is slideably mounted on the other end of the longitudinal rod and can slide along the latter.

The transverse rod is dismountably fixed to the transverse rod disc, and the latter, in turn, is rotatably mounted on the longitudinal rod disc. Hence, the transverse rod can rotate about and slide along the longitudinal rod.

The two guide sleeves are mounted respectively on the longitudinal and the transverse rods with the same structure, and they not only able to slide respectively along longitudinal and transeverse rods, but also able to rotate respectively about these rods.

The two scribing units are the same, each comprising a scribing pointer, a scribing arm and a connecting bush. The scribing arm is hinged to the connecting bush, hence the angle between the scribing arm and the longitudinal or the transverse rod can be changed if necessary. The scribing pointers are connected to the scribing arms in the same way, hence the angle between the scribing pointers at the lower ends of the scribing arms can be replaced by torch cutters or other cutting tools.

BRIEF DESCRIPTION OF THE DRAWINGS

FIG. 4. is a sketch showing the assembly of the guide sleeve and length measuring slider in the guide sleeve unit.

FIG. 5 is a cross section showing the connecting bush of scribing arm in the scribing unit.

DETAILED DESCRIPTION OF THE PREFERRED EMBODIMENT

The preferred embodiment of the present invention will be described in detail below with reference to the attached drawings.

Figure 2A:
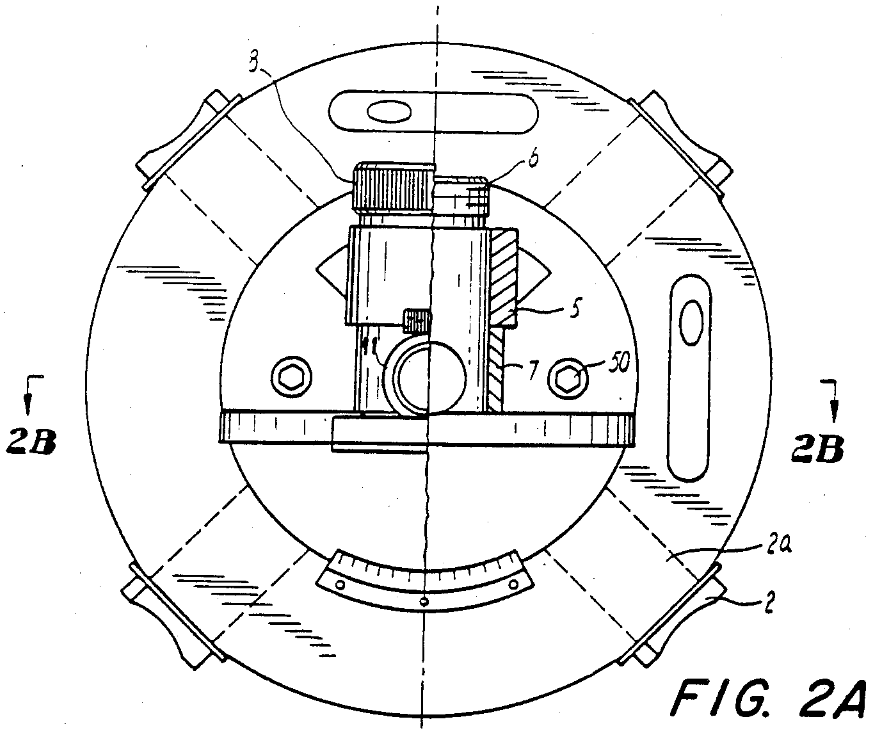
FIG. 2 illustrates the structure of the magnetic base and the rotary units after assembling also illustrates the hinge unit and the locking unit in a partly cross sectional view for the preferred embodiment of the present invention.
Figure 2B:
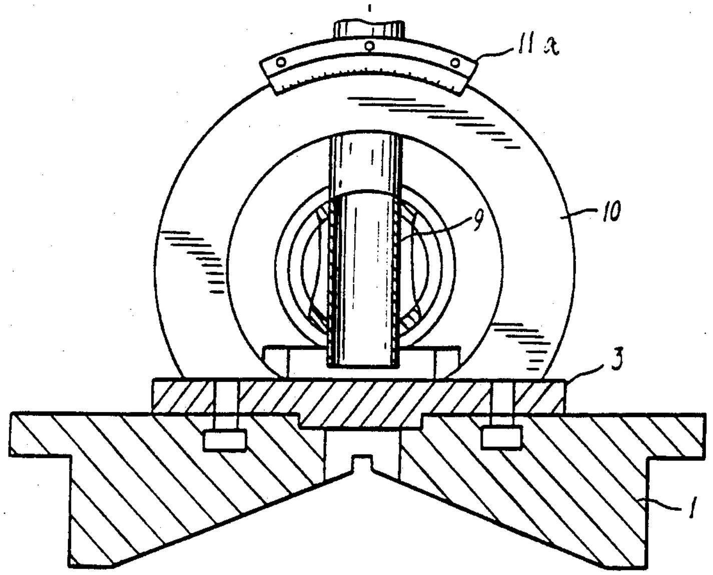
Figure 3A:
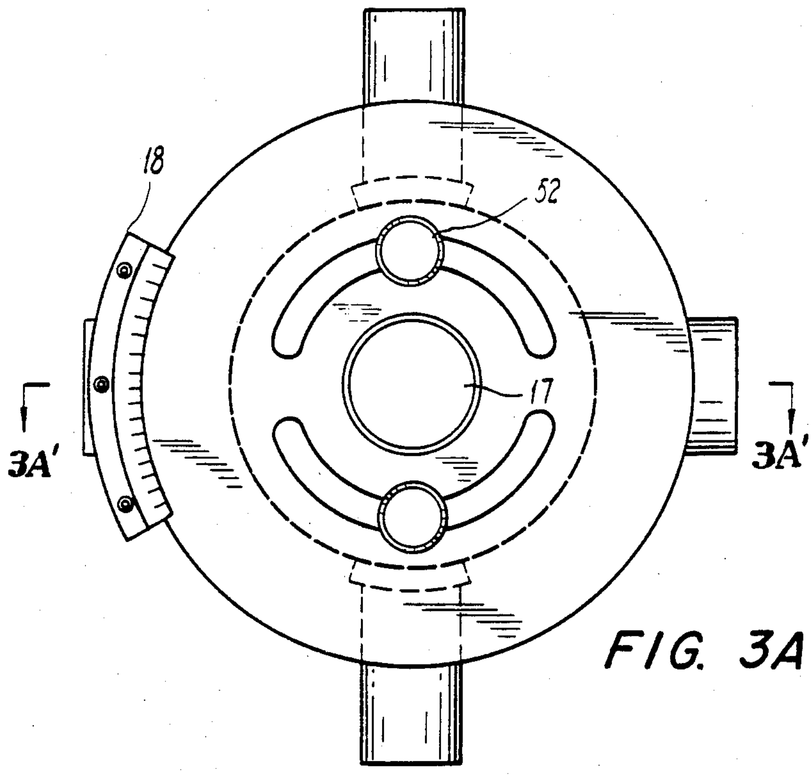
FIG. 3(A) is taken from the top and FIG. 3 (B) from the bottom.
Figure 3A:
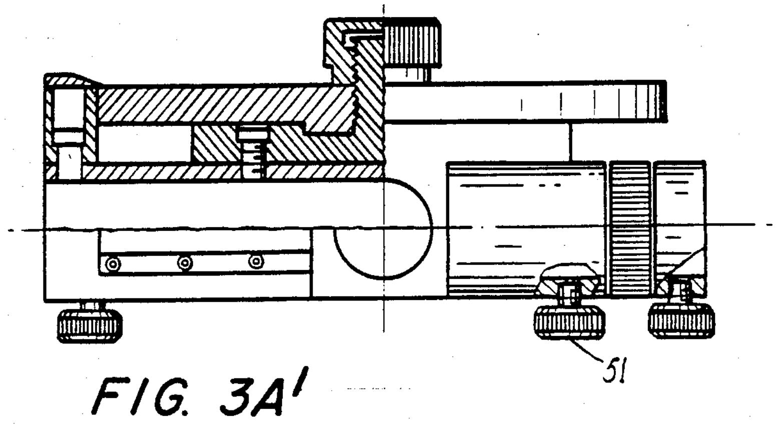
Figure 3B:
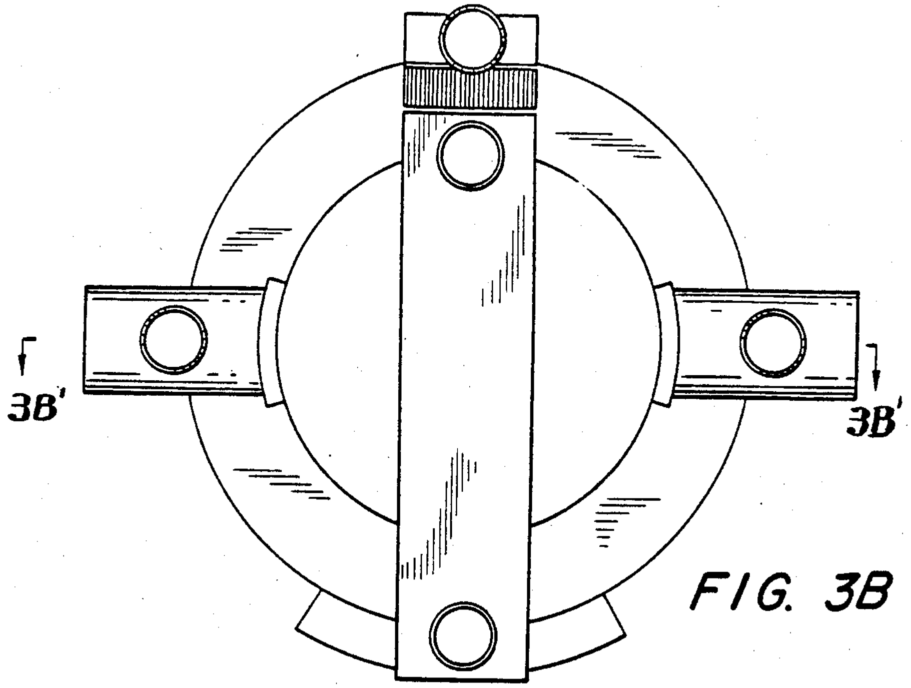
FIG. 3 (A) and FIG. 3 (B) are views showing the structure of the longitudinal rod disc and the transverse rod disc after assembling.
Figure 3B:
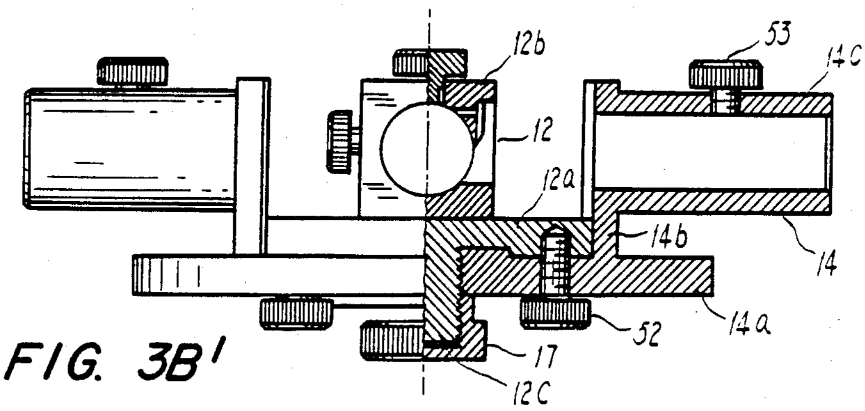

Referring to FIG. 2, the magnetic base (1) of the pipe joint intersection contour scriber of the present invention is a disc-shaped part whose upper and lower surfaces are parralel to each other, two level gauges being attached on the upper surface. Located on the lower surface is a V-shaped groove symmetrical to the axis of magentic base, its axis perpendicularly crossing the axis of the magetic base. The V-shaped groove is mainly used for cylinders or cones with various sizes. There are four holes equally spaced on the magentic base, which are used to install four magnetic (2*a*) and four permanent magnet switches (2). When scribing, the V-shaped groove of magnetic base (1) is put on the cylindrical surface of the pipe, the permanent magnet switches are turned on, and the magnetic base is then attracted securely on the workpiece. On the upper surface of magnetic base is then attracted/securely on the workpiece. On the upper surface of magnetic base (1), there is a T-shaped circle groove circle groove for accommodating the bolts with T-heads. A bore is formed at the centre of the magentic base (1) for centering a 360°-graduated disc (3).

FIG. 2 shows the rotary unit (3) which comprises a 360°-graduated disc (3) a cylindrical flange of which is fitted within the bore of the magnetic base (1). This makes the 360°-graduated disc (3) be aligned with the magnetic base (1) and be able to rotate about the axis of magnetic base within the range of 0° to 360°. An angle measuring slider (4) on the magnetic base indicates the rotating angle of 360°-graduated disc (3), on which there are two holes symmetrical to the axis of the disc and being aligned with the circle groove for passing through the fixing bolts. When the bolts (50) are tightened, the 360°-graduated disc is fixed to the magnetic base. On the 360°-graduated disc (3), a supporting bush (5) and a 180°-graduated bow-shaped disc (10) are mounted. Their axis are aligned with each other.

The hinge unit includes a hinge shaft (6) which is rotatably mounted in the supporting bush (5). A moving bush (7) is mounted on the top end of the hinge shaft (6) with its end surface abuts against the end surface of the supporting bush (5). A hole is drilled through the moving bush(7) and the hinge shaft (6) with its axis perpendicular to and intersecting with the axis of the hinge shaft (6) and, at the same time, being aligned with the axis of 360°-graduated disc (3). This drilled hole is used for installing the longitudinal rod (9). The other end of the hinge shaft is threaded.

The locking unit includes a locking nut (8) on the threaded part of the hinge shaft (6). When screwing up the locking nut (8), the hinge shaft (6) carrying the longitudinal rod (9) and the moving bush (7) moves toward the supporting bush (5) and stop at the limitation of the supporting bush (5), which is fixed on the 360°-graduated disc. The longitudinal rod (9) is thus locked. Unscrewing locking nut (8) allows the longitudinal rod (9) to rotate around the intersection point between the axis of the hinge shaft (6) and the magnetic base (1) in a plane perpendicular to the lower surface of the magnetic base (1) within the range of 0°-180° a fixing bush (11) with an angle measuring slider is fixed on the longitudinal rod (9). The rotation of the angle measuring slider along the outer circumference of the bow-shaped 180°- graduated disc (10) indicates the rotating angle.

Figure 1:
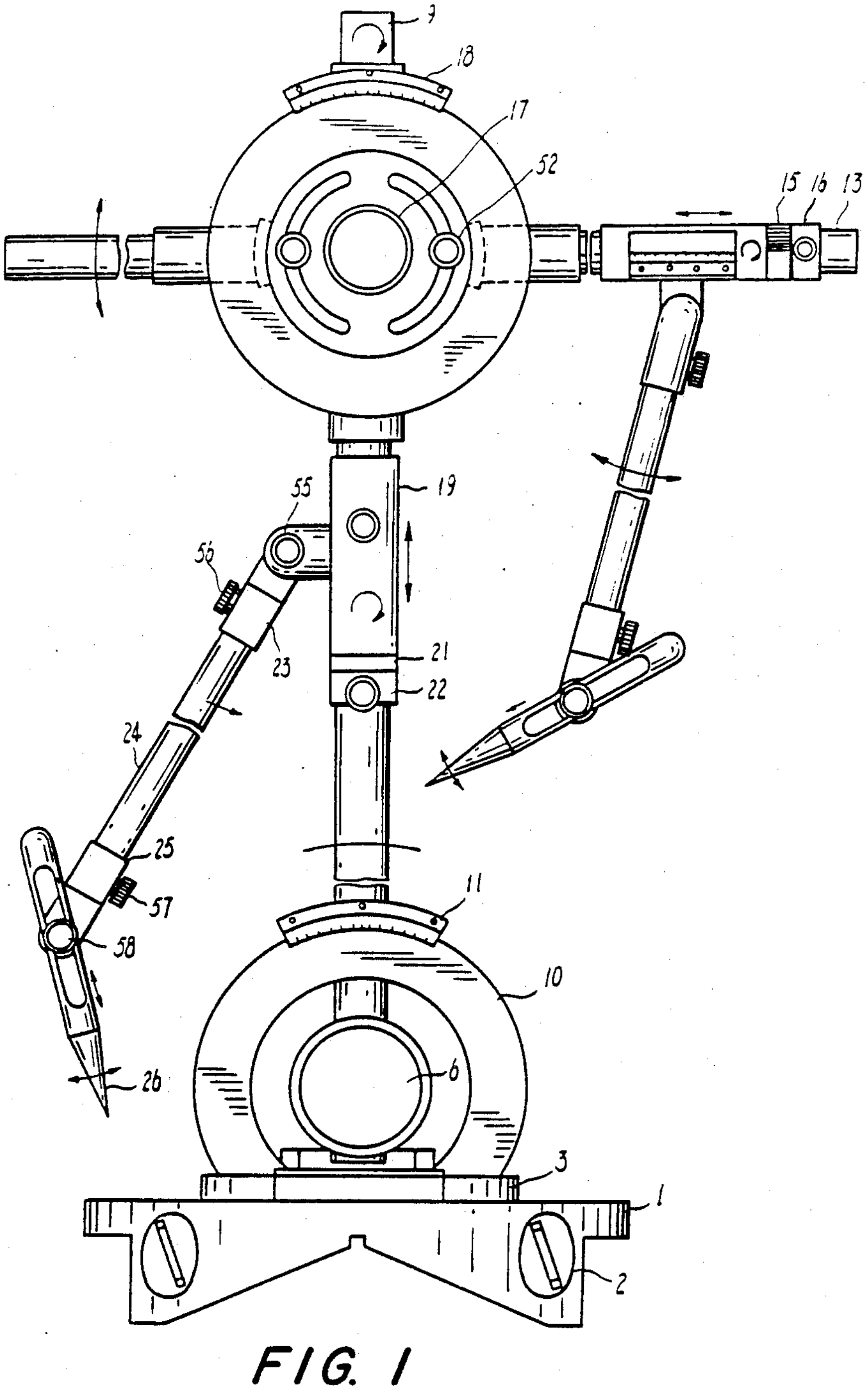
FIG. 1 is a front view of the multifunctional contour scriber of the present invention.

With reference to FIG. 1 and FIG. 3. The longitudinal rod (9) and the transverse rod (13) both are made of pipes with thin walls and the same diameter. Each of them has a long slot with the width of 2.5 mm and graduations showing the axial length.

The longitudinal rod disc (12) comprises a disc (12*a*), a square bush (12*b*) and a threaded shaft (12*c*). The axial length of the square bush (12*b*) is approximately the same as the diameter of the disc (12*a*). One face of the square is fixed to the surface of the disc. The threaded shaft (12*c*) with a circle groove protrudes out of the center of the disc (12*a*). In the center of the square bush (12*b*), there is a bore whose inner diameter is fitted with the outer diameter of the longitudinal rod. The axis of the bore is perpendicular to the axis of the disc. On one side of the square bush (12*b*), there is a slot to accomodate the length measuring slider which, together with the graduations on the longitudinal rod, shows the axial position. On the other side of the square bush (12*b*), there are two holes of M6 for fixing longitudingal rod (9) in the hole of the square bush. On the bottom side of the square bush there are two holes of M4, see FIG. 3(A) Screwing in fixing bolt (51) in the hole of M4, the unthreaded part of bolt (51) extends into the long slot of the longitudinal rod (9), thus allows the longitudinal rod disc (12) to move up and down axially along the longitudinal rod (9). Unscrewing the bolt (51) in the hole of M4 enables longitudinal rod disc (12) to rotate about as well as move along the longitudinal rod (9). On one end of the square bush (12) are mounted a fine adjusting nut (15) and a fixing bush (16). On the other end is mounted an angle measuring slider (18).

The transverse rod disc (14) comprises a 90°-graduated disc (14*a*), two connecting plates (14*b*) protruding out on both sides of the disc with the distance between the two plates (14*b*) being at least larger than the diameter of the longitudinal rod disc (12), and two sleeves (14*c*) laterally protruding out of the connecting plates (14*b*). The two sleeves (14*c*) have coaxial inner bores which are perpendicular to and intersecting with the axis of the 90°-graduated disc (14*a*). Each of the sleeves has a threaded hole for mounting the transverse rod (13) with the same diameter but different lengths in terms of the necessity of scribing different contours. The transverse rod disc (14) is fixed to the transverse rod (13) when a fixing bolt (53) is screwed in.

In the center of the 90°-graduated disc (14*a*), there is a round flange with a hole in its center. The assemblage of the transverse rod disc (14) and longitudinal rod disc is shown in FIG. 3. When the round flange of the transverse rod disc (14) is fitted into the circle groove of the longitudinal rod disc (12), the threaded shaft (12*c*) protruding out of the longitudinal rod disc (12) is also inserted into the hole at the flange center of the transverse rod disc (14), thus ensuring the alignment for the axis of the longitudinal rod disc (12) and the transverse rod disc (14), allowing the transverse rod disc (14) to rotate around the longitudinal rod disc (12), and ensuring the axis of the transverse rod and longitudinal rod to intersect in the same plane. The transverse rod disc (14) is connectcd with the longitudinal rod disc (12) by the nut (17) and two blots (52). On the disc (12*a*) of the longitudinal rod disc (12), there are two threaded holes, and accordingly there are two circle grooves to accommodate the fixing bolts (52) symmetrically placed on the 90°-graduated disc (14*a*) of the transverse rod disc (14). Unscrewing the nut (17) and the two fixing bolts (52) enables the transverse rod (13) to change the intersecting angle with longitudinal rod (9) within the range of 0° to 90°. The angular graduation of the 90°-graduated disc (14*a*) corresponding to the reference line of the angle measuring slider determines the angular relationship between the longitudinal rod (9) and the transverse rod (13).

FIG. 4 shows the structure of the guide sleeve units which is similar to that of square bush (12*b*) of longitudinal rod disc (12). The guide sleeve (19) comprises a round pipe (19*a*) and a connecting plate (19*b*) protruding out radially of the round pipe. The inner hole of the round pipe (19*a*) accommodates the longitudinal rod (9) and two thin metal rings can be placed in the two ends of the inner hole to protect the longitudinal rod (9) from wear. On the lateral wall of the round pipe (19*a*), there is a milled plane tangential to the inner diameter of the round pipe (19*a*), on which is mounted a length measuring slider (20). After being mounted, the graduations on the slider mating with the graduations on the longitudinal rod (9) indicate the relative displacement of the guide sleeve (19) to the longitudinal rod (9). The guide sleeve (19) may move axially along longitudinal rod (9) after the longitudinal rod (9) being installed into the guide sleeve (19), two bolts (55) are screwed into hole of M4, and the unthreaded part of the bolt being extended into the long slot of longitudinal rod (9). Unscrewing the bolts of M4 enables the guide sleeve (19) to rotate about the axis of the longitudinal rod (9). Screwing up the fixing bolt (54) of M6 fixes the guide sleeve (19) to the longitudinal rod (19). A fine adjusting nut (21) and a fixing bush (22) can be mounted on the end of guide sleeve (19), see FIG. 1. On the round part of the guide sleeve (19) is welded the connecting plate (19*b*), one face of which is aligned with the axis of the round part of the guide sleeve (19*a*). A drilled hole on the connecting plate (19*b*) is used to accommodate an inner hexagon-headed bolt.

A similarly structured guide sleeve is also mounted on the transverse rod (13).

The guide sleeve units and scribing units are mounted both on the transverse rod (13) and on longitudinal rod (9). The scribing unit comprises a scribing arm connecting bush (23), a scribing arm (24), a scribing pointer connecting bush (25) and a scribing pointer (26). The scribing arm connecting bush is hinged to the guide sleeve (19) by an inner henxagon-headed bolt (55), see FIG. 1. One end of the scribing arm (24) is fixed in the scribing arm connecting bush (23) by a fixing bolt (56), another end is fixed in the scribing pointer connecting bush (25) by fixing bolt (57). The scribing pointer is fixed on the lower end of the scribing arm by another inner hexagon-headed bolt (58).

Referring now to FIG. 5, one end of the scribing arm connecting bush (23) forms a sleeve, the inner diameter of which is fitted with the outer diameter of the scribing arm (24), while another end forms a plate protruding out axially. One face of the plate is aligned with the axis of the sleeve. A threaded hole on the plate is used to fix the scribing arm (24) into the sleeve by a fixing bolt (56). The plane surface of the plate of the scribing arm connecting bush (23) aligned with the axis of the sleeve is in contact with the plane surface of the connecting plate (19*b*) of guide sleeve (19) aligned with the axis of its round pipe (19*a*). To fix the angle between the scribing arm (24) and the longitudinal rod (9) (or transverse rod (13)), the bolt hole of the guide sleeve (19) is aligned with the threaded hole on the connecting bush (23), the inner henxagon- headed bolt (55) being inserted and tightened. Unscrewing the inner hexagon-headed bolt (55) enables the scribing arm (24) to rotate about the hinge shaft. Since the axis of the scribing arm (24) and the longitudinal rod (9) (or transverse rod (13)) are in the same plane, the angle between the scribing arm (24) and the longitudinal rod (9) (or transverse rod (13)) can be changed.

The structure of scribing pointer connecting bush (25) is the same as the structure of scribing arm connecting bush (23). To fix the scribing pointer (26) on the lower end of the scribing arm (24), this end is inserted into the hole of the sleeve of scribing pointer connecting bush (25), the fixing bolt (57) of the scribing arm is screwed up, and the inner hexagon-headed bolt (58) of the scribing point is tightened after the slot of scribing pointer (26) is aligned with the threaded hole on the plate of scribing point connecting bush (25). Unscrewing the inner hexagon bolt (58) of scribing point enables the distance between scribing point and the axis of fixing bolt (58) to be adjusted and enables scribing pointer (26) to rotate about the hinge shaft so as to adjust the angle between scribing point (26) and the workpiece.

Since the scribing units are connected to the longitudinal rod (9) and transverse rod (13) respectively by the guide sleeves (19), the scribing units can move axially along as well as rotate about the longitudinal rod (9) and transverse rod (13), thus ensuring that the scribing point always contacts the surface of the workpiece.

The guide sleeve (19) and scribing units mentioned above apply to both longitudinal rod (9) and transverse rod (13). This ensures interchangeability and universality of the commonent parts, and cost reduction as well.

Figure 6:
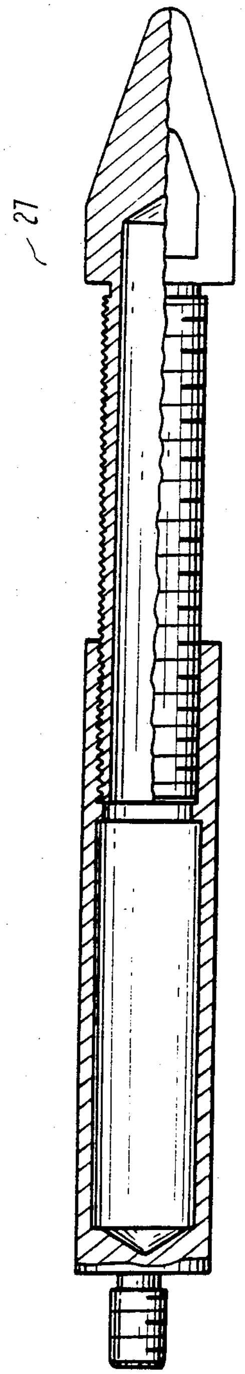
FIG. 6 is a cross section of a strut bar.

When scribing on large size workpieces or workpieces being far apart from the ground, The three strut bars (27) as shown in FIG. 6 may be mounted on the magnetic base (1). The threaded ends of the strut bars (27) are screwed into the threaded holes equally spaced along the circumference of the magnetic base (1), the other end contacts the internal wall of the workpiece. The lengths of the strut bars (27) are to be adjusted as to align the axis of the magnetic base (1) with the axis of the workpiece. The intersection contour is then scribed.

Figure 7:
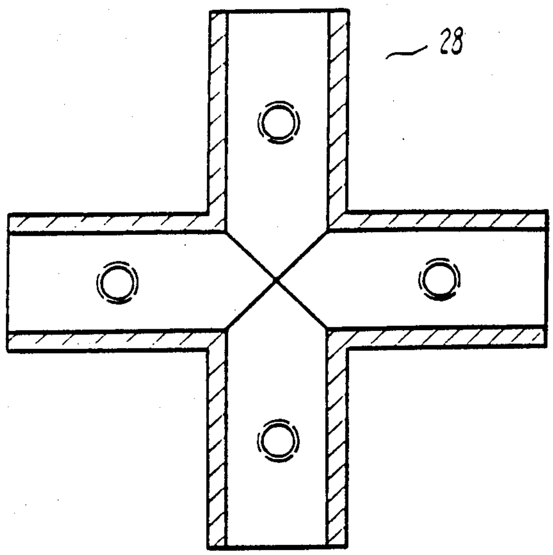
FIG. 7 is a cross section of a cross-shaped bush.

A cross-shaped bush (28) as shown in FIG. 7 may be mounted on the transverse rod (13). The transverse sleeve part of the cross-shaped bush (28) is put on the transverse rod (13). The axis of the transverse sleeve part of the cross-shaped bush (28) is then aligned with the axis of the transverse rod (13), and the axis of the longitudinal sleeve of the cross-shaped bush (28) accordingly is parallel to the axis of longitudinal rod (9). There is a threaded hole on the transverse sleeve of the cross-shaped bush. Screwing in a fixing bolt through the hole fixes the cross-shaped bush (28) to the transverse rod (13), while unscrewing the fixing bolt enables cross-shaped bush (28) to slide freely along and/or rotate freely about transverse rod (13). The longitudinal sleeve of cross-shaped bush (28) may be used to mount scribing arm (24), scribing pointer connecting bush (25) and scribing pointer (26). The mounting procedure is the same as mentioned above. The height of the scriber is then increased when the cross-shaped bush (28) is mounted, so that it can be used in the case when the workpiece is far apart from the ground.

Index accuracy, large range of height adjustment, interchangeability of component parts and regulation flexibility feature the multifunctional contour scriber of the present invention. It can be used to scribe any contour curves directly and precisely on a plane, a convex or concave surface of a box, a pump case and a shell, etc. for complicated large size workpieces. No indexer, height gauge, or other auxillary scribing tool is needed.

Operation

Example 1 Scribing the Intersection Contour of the Main Pipe

Figure 8:
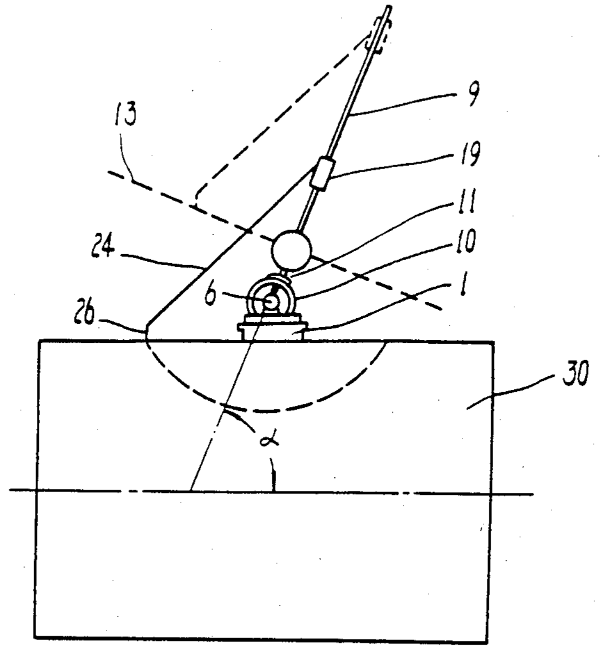

Referring to FIG. 8, the magnetic (1) is put on the main pipe (30). The V-shaped groove on the lower plane of magnetic base (1) makes the axis of longitudinal rod (9) automatically intersect the axis of main pipe (30). Magnet switches (2) are turned on as to make the magnetic base (1) be attracted securely on the surface of the main pipe (30). The longitudinal rod (9) is turned about hinge shaft (6) until the angle measuring slider (11) on the longitudinal rod indicates at the bow-shaped 180°-graduated disc (10) the correct angle $\alpha$ already known in terms of the intersecting angle between the main and branch pipes. Locking nut (8) is tightened to lock the longitudinal rod (9). The transverse rod (13) is moved along longitudinal rod (9) and is at a position lower than the guide sleeve (19) on longitudinal rod (9). The scribing pointer (26) mounted on the end of the scribing arm (24) of the longitudinal rod (9) is then used to measure and obtain the radius r of the branch pipe along transverse rod (13), thus the radius r is the vertical distance between the scribing point and the axis of longitudinal rod. The inner hexagon-headed bolt (55) on guide sleeve (19) is tightened in order to fix the angle between the scribing arm (24) and the longitudinal rod. The transverse rod (13) is then removed off the transverse rod disc (14). If the radius of branch pipe is small, the cross-shaped bush may replace the transverse rod disc(14). The longitudinal sleeve of the cross-shaped bush is put on longitudinal rod (9), and transverse rod (13) is then put in the transverse sleeve of the cross-shaped bush. After the radius of the branch pipe is measured and obtained, the transverse rod may be removed off the cross-shaped bush. Then, the guide sleeve (19) is allowed to move along and rotate about the longitudinal rod (9) so as to maintain the contact of scribing pointer (26) with the surface of the workpiece. A closed curve scribed when the scribing unit rotates around the longitudinal rod (9) which represents the pipe joint intersection contour on the main pipe.

Example 2 Scribing the Intersection Contour of the Branch Pipe

Figure 9:
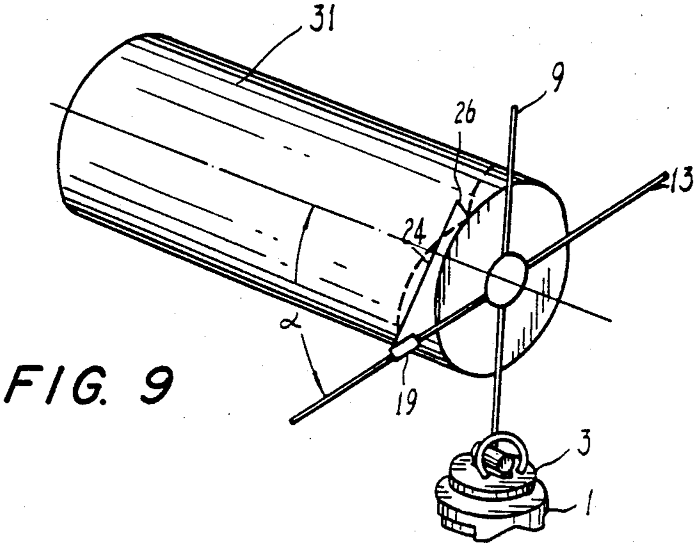

Referring to FIG. 9, the magnetic base (1) is put on the ground and the intersection point of the longitudinal rod (9) and transverse rod (13) is adjusted to be at the central axis of the branch pipe (31), set the longitudinal rod (9) at right angles with the transverse rod (13), then set the scribing pointer (26) at the end of the scribing arm (24) on the longitudinal rod (9) to measure and obtain the radius R of the main pipe along the longitudinal rod (9) thus the radius R is the vertical distance between the scribing point and the axis of the transverse rod (13). When the zero mark of the angle measuring slider (4) on the magnet base (1) coincides with the zero mark on the 360°-granduate disc (3) unscrew the locking nut (8) of the locking unit and rotate the longitudinal rod (9) to make the right-hand and left-hand transverse rod (13) both contact with the branch pipe's external diameter. Then, rotate the 360°-graduate disc (3) to the left until the meausring slider or the magnetic base (1) indicates the known angle $\alpha$, screwing up the bolts (50) in order to fix the angle between the left-hand transverse rod and the axis of the branch pipe (31) , the left-hand transverse rod (13) remain in contact with the branch pipe (31) but the right-hand transverse rod (13) disengage from the branch pipe (31). The guide sleeve (19) is then allow to move along as well as rotate about the left-hand transverse rod (13) in order that the scribing pointer (26) remains in contact with the surface of workpiece. A curve scribed when the scribing point rotates around the left hand transverse rod which represents half of the pipe joint intersection contour on the branch pipe (31). Another half of the pipe joint contour can be scribed in the same way by the guide sleeve unit and scribing unit on the right-hand transverse rod or by turning the left-hand transverse rod to the right.

It is noded that instead of using the invention as a pipe joint intersection contour scriber it could be used to scribe a circle, an ellipsord a hyperbola, a parabola etc.

As changes may be made in various parts of the invention without departing from the spirit and scope of the invention, the invention is not to be limited to the exact parts described which have been given by wayof illustration only.

I claim:

1. A pipe joint intersection contour scriber comprising: a magnetic base, a rotart unit, a hinge unit, a locking unit, a longitudinal rod, a longitudinal rod disc, a transverse rod, a transverse rod disc, guide sleeves units and scribing units, wherein said magnetic base has (1) a lower surface with a longitudinal V-shaped groove for resting the contour scriber on a cylindrical piece of work, and (2) a central axis extending vertically of said lower surface and perpendicularly intersecting the longitudinal axis of said V-shaped groove;

said rotary unit has a 360°-graduated disc which is mounted on said magnetic base and rotatable around said central axis of said magnetic base in a plane parallel to the lower surface of the magnetic base;

said hinge unit permits the lower end of said longitudinal rod to be hinged to said 360°-graduated disc by way of a turntable hinge shaft which has an axis perpendicularly intersecting said central axis of said magnetic base at a point about which said longitudinal rod is permitted to rotate in a plane perpendicular to said lower surface of said magnetic base;

said locking unit acts on said hinge shaft so as to lock said longitudinal rod at a predetermined angular position with respect to the lower surface of the magnetic base;

said longitudinal rod disc is slidably mounted on the other end of said longitudinal rod with a central axis perpendicular thereto;

said transverse rod is removably mounted on said transverse rod disc, which, in turn, is rotatably mounted on said longitudinal rod disc, said transverse rod disc having a central axis aligned with said central axis of said longitudinal rod disc so that said transverse rod is permitted to rotate around as well as to slide axially along said longitudinal rod;

said guide sleeve units are respectively mounted on said longitudinal and transverse rods, so as to slide along as well as rotate around longitudinal and transverse rods, respectively; and said scribing units include two scribing arms respectively fixed in two scribing arm connecting bushings which in turn are hinged to said guide sleeve units for changing the intersecting angle between said scribing arm and longitudinal or transverse rod.

2. A pipe joint intersection contour scriber as set forth in claim 1 wherein said magnetic base has holes along its circumference in which are mounted magnets mating with permanent magnet switches.

3. A pipe joint intersection contour scriber as set forth in claim 1 wherein said longitudinal rod disc has a radial hole whose diameter is fitted with the outer diameter of said longitudinal rod, the axis of said hole perpendicularly intersecting said central axis of said magnetic base to enable said longitudinal rod disc to slide along said longitudinal rod.

4. A pipe joint intersection contour scriber as set forth in claim 1 wherein said transverse rod disc has two equally spaced radial holes which are fitted with the outer diameters of said transverse rods, the axis of said holes perpendicularly intersecting the axis of said transverse rod disc, said holes being used for accommodating said transverse rod.

5. A pipe joint intersection contour scriber as set forth in claim 1 wherein the axis of said transverse rod intersects the axis of said longitudinal rod in the same plane, the intersecting point thereof being at the axis of said longitudinal rod disc.

6. A pipe joint intersection contour scriber as set forth in claim 1 wherein a 180°-graduated disc is perpendicularly mounted on said 360°-graduated disc, with an axis being aligned with the axis of said hinge shaft.

7. A pipe joint intersection contour scriber as set forth in claim 1 wherein a fixing bushing with an angle measuring slider is mounted on said longitudinal rod, and said angle measuring slider mates with said 180°-graduated disc.

8. A pipe joint intersection contour scriber as set forth in claim 1 wherein both said longitudinal and transverse rods have long slots with length graduations.

9. A pipe joint intersection contour scriber as set forth in claim 1 wherein on one side of said guide sleeve there is a plane which is tangential to the internal hole of said guide sleeve and is used to mount a length measuring slider by means of two fixing bolts.

10. A pipe joint intersection contour scriber as set forth in claim 1 wherein said transverse rod is adapted to carry a cross-shaped bushing.

11. A pipe joint intersection contour scriber as set forth in claim 1 wherein three strut bars are adapted to be fit into three threaded holes which are 120°-spaced along the circumference of said magnetic base.

* * * * *